United States Patent
Babey et al.

(10) Patent No.: US 9,977,665 B2
(45) Date of Patent: *May 22, 2018

(54) SATISFYING APPLICATION DEPENDENCIES

(71) Applicant: Microsoft Technology Licensing, LLC, Redmond, WA (US)

(72) Inventors: Matthew Christopher Babey, Brockton, MA (US); Eric Jewart, Waltham, MA (US); Kristofer Hellick Reierson, Acton, MA (US); Angela Mele Anderson, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/148,183

(22) Filed: May 6, 2016

(65) Prior Publication Data
US 2016/0328224 A1 Nov. 10, 2016

Related U.S. Application Data

(63) Continuation of application No. 12/977,095, filed on Dec. 23, 2010, now Pat. No. 9,354,852.

(51) Int. Cl.
*G06F 15/16* (2006.01)
*G06F 9/445* (2018.01)
(Continued)

(52) U.S. Cl.
CPC ............... *G06F 8/61* (2013.01); *G06F 8/71* (2013.01); *H04L 41/0806* (2013.01); *H04L 67/141* (2013.01)

(58) Field of Classification Search
CPC . H04L 65/1016; H04L 65/1006; H04L 65/80; G06F 15/16; G06F 3/048
(Continued)

(56) References Cited

U.S. PATENT DOCUMENTS 5,721,824 A 2/1998 Taylor
6,427,208 B1 7/2002 Jordan et al.
(Continued)

FOREIGN PATENT DOCUMENTS

CN 1808379 7/2006
CN 1936849 3/2007
(Continued)

OTHER PUBLICATIONS

The Extended European Search Report dated Apr. 6, 2017 for European Patent Application No. 16195202.3, 8 pages.
(Continued)

*Primary Examiner* — Anthony Mejia
(74) *Attorney, Agent, or Firm* — Workman Nydegger (57) ABSTRACT

The dependencies of an application are identified by intercepting application programming interface calls made by an application. A determination is then made at the runtime of the application as to whether the dependencies of the application are present. If the dependencies are not present, a client device upon which the application is executing is configured such that the dependencies are present and are made available only to the authorized application. If the dependencies are present and the application is authorized to interact with the dependencies, the application is permitted to execute.

21 Claims, 7 Drawing Sheets

(51) Int. Cl.
　　*G06F 9/44* (2018.01)
　　*H04L 12/24* (2006.01)
　　*H04L 29/08* (2006.01)

(58) Field of Classification Search
　　USPC .................................. 709/220, 226, 203
　　See application file for complete search history.

(56) References Cited

U.S. PATENT DOCUMENTS

| | | |
|---|---|---|
| 6,496,847 B1 | 12/2002 | Bugnion et al. |
| 6,763,370 B1 | 7/2004 | Schmeidler et al. |
| 6,938,096 B1 | 8/2005 | Greschler et al. |
| 6,959,441 B2* | 10/2005 | Moore .................. G06F 9/46 719/310 |
| 7,017,188 B1 | 3/2006 | Schmeidler et al. |
| 7,028,305 B2 | 4/2006 | Schaefer |
| 7,200,632 B1 | 4/2007 | Greschler et al. |
| 7,219,304 B1 | 5/2007 | Kraenzel et al. |
| 7,225,264 B2 | 5/2007 | Croman et al. |
| 7,340,739 B2 | 3/2008 | Alam |
| 7,426,661 B2 | 9/2008 | Schaefer |
| 7,451,451 B2 | 11/2008 | Schaefer |
| 7,590,743 B2 | 9/2009 | Willis |
| 7,624,086 B2 | 11/2009 | Keith, Jr. |
| 7,690,039 B2 | 3/2010 | Schmeidler et al. |
| 7,707,641 B2 | 4/2010 | Schmeidler et al. |
| 7,730,169 B1 | 6/2010 | Greschler et al. |
| 7,788,536 B1 | 8/2010 | Qureshi et al. |
| 7,797,372 B2 | 9/2010 | Greschler et al. |
| 7,802,294 B2 | 9/2010 | Perlin et al. |
| 8,434,093 B2 | 4/2013 | Larimore et al. |
| 8,468,542 B2 | 6/2013 | Jacobson et al. |
| 2002/0007347 A1 | 1/2002 | Blumenthal et al. |
| 2002/0087883 A1 | 7/2002 | Wohlgemuth et al. |
| 2002/0157089 A1 | 10/2002 | Patel et al. |
| 2003/0033539 A1 | 2/2003 | Cheng |
| 2003/0037030 A1 | 2/2003 | Dutta et al. |
| 2003/0191799 A1 | 10/2003 | Araujo et al. |
| 2005/0114870 A1 | 5/2005 | Song et al. |
| 2006/0239568 A1 | 10/2006 | Hanes et al. |
| 2007/0043831 A1 | 2/2007 | Kessler et al. |
| 2007/0083610 A1* | 4/2007 | Treder .................. H04L 67/34 709/217 |
| 2007/0112953 A1 | 5/2007 | Barnett |
| 2007/0143339 A1 | 6/2007 | Springett |
| 2007/0180433 A1 | 8/2007 | Ghobrial et al. |
| 2007/0244987 A1* | 10/2007 | Pedersen ............ H04L 63/0272 709/217 |
| 2007/0255798 A1 | 11/2007 | Schneider |
| 2008/0046961 A1 | 2/2008 | Pouliot |
| 2008/0059631 A1 | 3/2008 | Bergstrom et al. |
| 2008/0072219 A1 | 3/2008 | Kabadiyski |
| 2009/0037998 A1 | 2/2009 | Adhya et al. |
| 2009/0119643 A1 | 5/2009 | Sriramadhesikan et al. |
| 2009/0183182 A1 | 7/2009 | Parthasarathy et al. |
| 2009/0241104 A1 | 9/2009 | Amiga et al. |
| 2010/0037235 A1 | 2/2010 | Larimore et al. |
| 2010/0064284 A1 | 3/2010 | Winter |
| 2010/0138825 A1 | 6/2010 | Harrop |
| 2010/0186010 A1 | 7/2010 | Chalemin et al. |
| 2010/0275195 A1 | 10/2010 | Gorti |
| 2010/0306270 A1 | 12/2010 | McDiarmid et al. |
| 2010/0312966 A1 | 12/2010 | De Atley et al. |
| 2010/0313196 A1 | 12/2010 | De Atley et al. |
| 2011/0041124 A1 | 2/2011 | Fishman et al. |
| 2011/0088011 A1 | 4/2011 | Ouali |
| 2011/0126275 A1 | 5/2011 | Anderson et al. |
| 2011/0185355 A1 | 7/2011 | Chawla et al. |
| 2012/0005237 A1 | 1/2012 | Obata |
| 2012/0005674 A1 | 1/2012 | Larimore et al. |
| 2012/0102103 A1 | 4/2012 | Jacobson et al. |
| 2012/0166597 A1 | 6/2012 | Babey et al. |
| 2013/0080462 A1 | 3/2013 | Behne |

FOREIGN PATENT DOCUMENTS

| | | |
|---|---|---|
| JP | 2001051837 A | 2/2001 |
| JP | 2005339070 A | 12/2005 |
| JP | 2008310610 A | 12/2008 |
| TW | 200533111 | 10/2005 |
| WO | WO2008131456 | 10/2008 |
| WO | WO2009042327 A2 | 4/2009 |
| WO | WO2009052003 A2 | 4/2009 |

OTHER PUBLICATIONS

Translated Chinese Office Action dated May 5, 2015 for Chinese patent application No. 201110436260.X, a counterpart foreign application of U.S. Appl. No. 12/977,095, 15 pages.

Translated Chinese Office Action dated Jan. 24, 2014 for Chinese patent application No. 201110436260.X, a counterpart foreign application of U.S. Appl. No. 12/977,095, 13 pages.

Translated Chinese Office Action dated Oct. 11, 2014 for Chinese patent application No. 201110436260.X, a counterpart foreign application of U.S. Appl. No. 12/977,095, 11 pages.

European Office Action dated May 24, 2016 for European Patent Application No. 11851335.7, a counterpart foreign application of U.S. Appl. No. 12/977,095, 4 pages.

Extended European Search Report dated Feb. 4, 2015 for European patent application No. 11851335.7.

International Search Report, dated Sep. 27, 2012, in Application No. PCT/US211/066688, Filed Date: Dec. 22, 2011, pp. 9.

Translated Japanese Office Action dated Jan. 26, 2016 for Japanese patent application No. 20131546400, a counterpart foreign application of U.S. Appl. No. 12/ 977,095, 7 pages.

Mckay, et al., "Automated Deployment of Enterprise Application Updates", Retrieved at <<http://barrysearle.sys-con.com/node/48335/mobile >>, Jan. 24, 2005, pp. 5.

Office action for U.S. Appl. No. 12/977,095, dated Nov. 22, 2013, Anderson et al., "Satisfying Application Dependencies ", 15 pages.

Office action for U.S. Appl. No. 12/977,095, dated Mar. 5, 2015, Babey, et al., "Satisfying Application Dependencies", 26 pages.

Office action for U.S. Appl. No. 12/977,095, dated Nov. 22, 2013, Anderson et al., "Satisfying Application Dependencies ", 13 pages.

Office action for U.S. Appl. No. 12/977,095, dated Jun. 20, 2014, Anderson et al., "Satisfying Application Dependencies", 16 pages.

Taiwanese Office Action dated Nov. 16, 2015 for Taiwan patent application No. 100142411, a counterpart foreign application of U.S. Appl. No. 12/977,095, 11 pages.

Taiwanese Office Action dated Jul. 21, 2015 for Taiwan patent application No. 100142411, a counterpart foreign application of U.S. Appl. No. 12/977,095, 7 pages.

Japanese Office Action dated Aug. 9, 2016 for Japanese patent application No. 2013-546400, a counterpart foreign application of U.S. Appl. No. 12/977,095, 5 pages.

* cited by examiner

SATISFYING APPLICATION DEPENDENCIES

CROSS REFERENCE TO RELATED APPLICATIONS

This application is a continuation of co-pending U.S. patent application Ser. No. 12/977,095 filed Dec. 23, 2010 entitled "Satisfying Application Dependencies," which is expressly incorporated by reference herein in its entirety.

BACKGROUND

Computer application programs ("applications") typically have a series of dependencies that are required to successfully deploy and execute the application. These dependencies may include access to resources, such as databases, applications, hardware components, network connections, and the like. While the device is operating locally within the corporate network of an enterprise, many of these dependencies exist by virtue of being connected to the corporate network. However, once the device is no longer connected to the corporate network, for instance when the device leaves the premises of the corporation, the device may no longer be connected to the corporate network. As a result, many of the dependencies of the application that were present by virtue of the device being connected to the corporate network are no longer present. Accordingly, the application cannot deploy or execute on the device until the dependencies are restored.

One mechanism for restoring application dependencies requires that a connection be established with the corporate network. For instance, a corporate user working from home might need to connect to a corporate network via a virtual private network (VPN) in order to re-establish dependencies. However, utilizing a connection in this manner may be cumbersome, or may expose a corporate network to security threats.

It is with respect to these and other considerations that the disclosure made herein is presented.

SUMMARY

Technologies are described herein for satisfying the dependencies of virtualized applications. Through an implementation of the concepts and technologies presented herein, application dependencies can be identified and restored at application runtime. Consequently, a client device may successfully deploy and execute an application without having to establish a backend connection between the device and the corporate network. As used herein, the term "dependencies" refers to any resource that an application requires for execution. Dependencies may include, but are not limited to, configuration settings, hardware components, network connections, access privileges, or any other type of resource.

According to one aspect provided herein, an application virtualization environment is provided that is capable of executing a virtualized application by configuring a client device such that all dependencies of the virtualized application are present. It should be appreciated that the scope of the present disclosure is not intended to be limited to use within an application virtualization environment. Rather, the embodiments disclosed herein may be utilized to satisfy the dependencies of any type of application executing in a virtualized or non-virtualized environment.

According to another aspect, when a request is received to deploy a virtualized application, an application virtualization client component determines whether the dependencies requisite for deploying the virtualized application are present. If the application virtualization client component determines that the dependencies are not present, the application virtualization client component configures the client device such that the dependencies are present. If the application virtualization client component determines that the dependencies are present, the application virtualization client component deploys the virtualized application for execution.

According to another aspect, the application virtualization client component is also configured to provide a security boundary between a virtualized application and a non-virtualized application so that the non-virtualized application cannot access certain resources. For instance, in one embodiment the application virtualization client component intercepts application programming interface (API) calls made by the virtualized application for accessing resources, such as requests to access resources available to the client device. The application virtualization client component then modifies a namespace of the requested resource such that the resource is accessible at a new location. In some embodiments, the application virtualization client component may also modify an access control list (ACL) associated with the resource and pass the API call to the resource stored at the new location. Requests to access the resource from non-virtualized applications are not able to access the resource at its new location.

According to another aspect, application dependencies are identified prior to runtime by performing a static analysis on the application. In one implementation, the virtualized application is installed on a monitoring station that provides an environment where all of the dependencies of the virtualized application are present. A dependency analysis engine of the monitoring station monitors changes made to the monitoring station during the installation and execution of the virtualized application to identify the dependencies. Upon monitoring the virtualized application, the dependency analysis engine stores the data identifying the dependencies in a dependency analysis database. The dependency analysis database may be used at runtime of the application to ensure that all required dependencies are present.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for satisfying the dependencies of applications. As discussed briefly above, a client device configured in the manner disclosed herein can identify application dependencies and make those dependencies available at application runtime. In this manner, the client device can be configured for execution of the application without requiring manual action to satisfy the dependencies, such as connecting to a VPN.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for satisfying application dependencies will be described.

Figure 1:
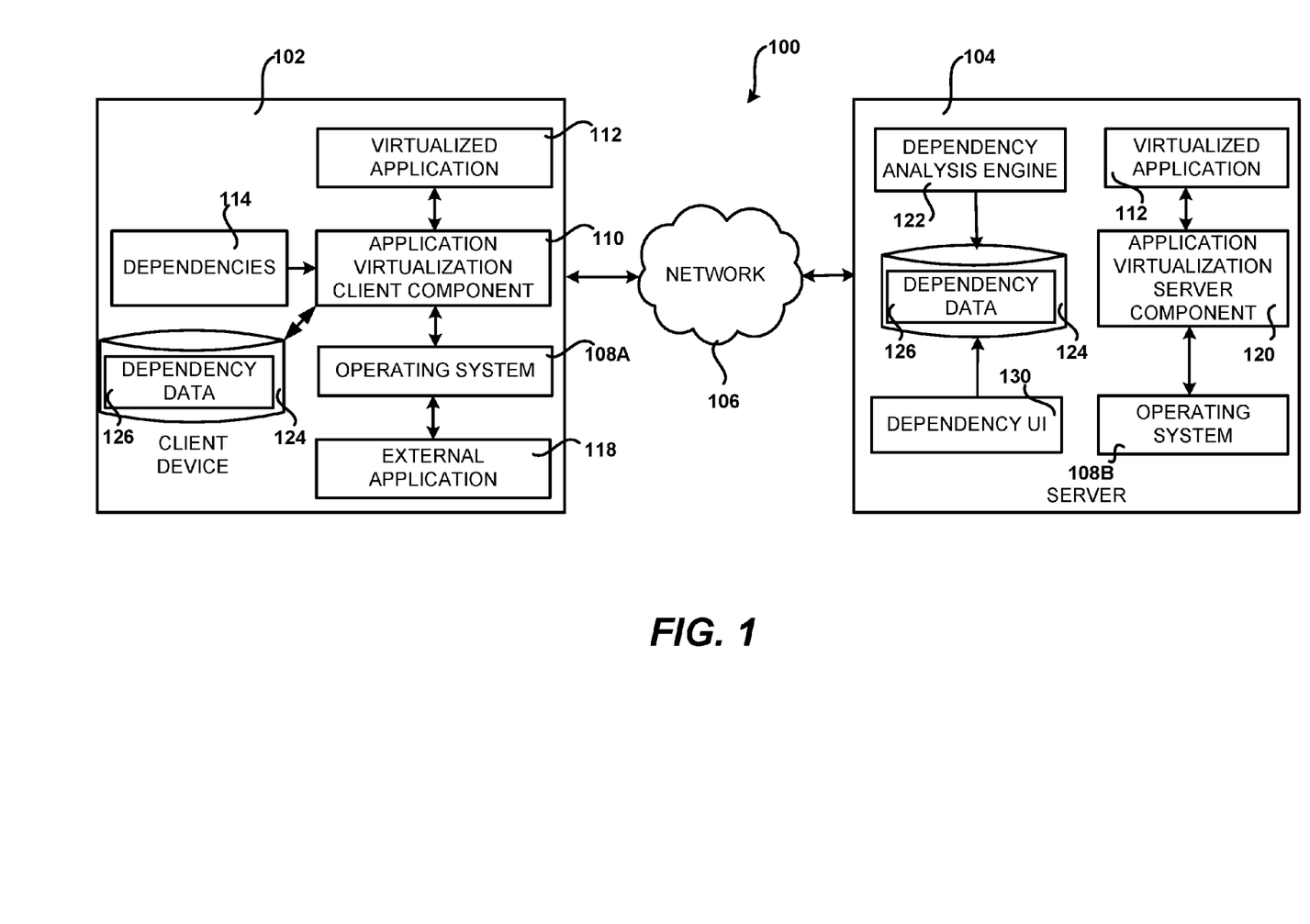
FIG. 1 is a software and network architecture diagram showing one illustrative operating environment for the embodiments disclosed herein.

FIG. 1 is a software and network architecture diagram showing one illustrative operating environment 100 for the embodiments disclosed herein. The illustrative operating environment 100 shown in FIG. 1 includes a client device 102 configured to communicate with a server 104 by way of the network 106. The client device 102 is a computing device configured to execute an operating system 108A and an application virtualization client component 110. The client device 102 may be a standard desktop or laptop computer, a tablet computer, a smartphone or any other type of computing device capable of performing the operations presented herein for satisfying the dependencies of virtualized applications. The client device 102 might also be a server computer configured to provide the functionality disclosed herein.

The server 104 is a computing system configured to execute an operating system 108B and the application virtualization server component 120. It should be appreciated that the server 104 may be an actual server computer configured to execute the application virtualization server component 110 or may comprise another type of computer system configured to perform the functionality described herein as being performed by the server 104.

The network 106 illustrated in FIG. 1 may comprise a wide area or local area network. For instance, the network 106 may be a corporate local area network, a wide area network such as the Internet, or a combination of multiple wide area and local area networks. It should be appreciated that while a single network 106 has been illustrated in FIG. 1, many other networks may be utilized. It should also be appreciated that while a single client device 102 and server 104 have been illustrated in FIG. 1, many such devices may be utilized by the embodiments disclosed herein.

As discussed briefly above, the client device 102 is configured to execute an application virtualization client component 110. The application virtualization client component 110 is a software component configured to provide an application virtualization environment. In this regard, the application virtualization client component 110 is configured to deploy and execute a virtualized application 112.

The application virtualization client component 110 provides functionality for encapsulating the execution of the virtualized application 112 from the operating system 108A. The application virtualization client component 110 might also provide functionality for encapsulating execution of the virtualized application 112 from other application programs and system resources of the client device 102. For instance, the application virtualization client component 110 might virtualize resources of the operating system 108A or the client device 102. When the virtualized application 112 attempts to access the physical resources, the application virtualization client component 110 presents a virtualized resource to the application 112. In this manner, the virtualized application 112 can be executed in a manner that does not impact the actual resources exposed by the operating system 108A or the client device 102.

According to other aspects, the application virtualization client component 110 also provides functionality for loading portions of the virtualized application 112 on demand. In particular, the application virtualization client component 110 may operate in conjunction with the application virtualization server component 120 to stream needed portions of the virtualized application 112 from the server 104 to the client device 102. In this manner, the virtualized application 112 can be accessed at the client device 102 on demand. Moreover, because only needed portions of the virtualized application 112 may be streamed from the server 104 to the client device 102, access to the virtualized application 112 may be provided without streaming the entire application 112 from the server 104 to the client device 102.

Additional details regarding the functions provided by the application virtualization client component 110 for encapsulating execution of the virtualized application 112 and for streaming the virtualized application 112 from the server 104 to the client device 102 can be found in U.S. Pat. No. 7,225,264 issued May 29, 2007 entitled "Systems and Methods for Delivering Content over a Computer Network," U.S. Pat. No. 7,200,632 issued Apr. 3, 2007 entitled "Method and System for Serving Software Applications to Client Computers," U.S. Pat. No. 7,451,451 filed Nov. 11, 2008 entitled "Operating System Abstraction and Protection Layer," and U.S. Pat. No. 7,797,372 issued Sep. 14, 2010 entitled "Serving Software Applications from Servers for Client Computers," each of which is incorporated herein in their entirety by reference.

As will be described in greater detail herein, the application virtualization client component 110 may also be configured to ensure that one or more dependencies 114 of the virtualized application 112 are satisfied at a runtime of the application 112. As used herein, the term "dependencies" refers to any resource that the application 112 requires for execution. Dependencies may include, but are not limited to, configuration settings, hardware components, network connections, access privileges, the presence of specific files in specific locations, application resources, such as the installation of an anti-virus software, hardware components such as a monitor or other device, memory requirements, processing capabilities, and others.

As will be discussed in greater detail below, the dependencies 114 may be identified during installation of the application 112, prior to runtime of the application 112, or at runtime of the application 112. For instance, when a request to execute the virtualized application 112 is received, the application virtualization client component 110 determines whether the dependencies 114 requisite for deploying and/or executing the virtualized application 112 are present. If the application virtualization client component 110 determines that the dependencies 114 are not present, the application virtualization client component 110 configures the client device 102 such that all of the dependencies 114 are present. Once all of the dependencies 114 are present or satisfied, the virtualized application 112 may be deployed. As used herein, the term "deploy" means to make the application 112 available for execution. Additional details regarding configuration of the client device 102 such that all of the dependencies 114 are present are provided below with respect to FIGS. 2-4.

It should be appreciated that the client device 102 may also include a non-virtualized external application 118 that may be executed on the operating system 108A. As will be described in greater detail below, the application virtualization client component 110 provides functionality in one embodiment for ensuring that the external application 118 cannot access resources that are utilized by the virtualized application 112. For instance, the application virtualization client component 110 might redirect a request to access to a resource to a location where the resource does not exist. In this way, the operating system may respond to the request indicating that the resource requested does not exist or cannot be located. Additional details regarding this process will be provided below with regard to FIGS. 5-6.

As described above, the server 104 might include the virtualized application 112, the application virtualization server component 110, and the operating system 108B. In addition, the server 104 may include a dependency analysis engine 122 and a dependency analysis database 124 for storing dependency data 126 identifying the dependencies 114. It should be appreciated that the dependency analysis database 124 containing dependency data 126 may also be stored and/or made accessible to the application virtualization client component 110 of the client device 102. According to embodiments, the server 104 may operate as a monitoring station that is configured to install and execute the virtualized application 112 and to identify the dependencies 114 of the virtualized application 112. According to various embodiments, the dependency analysis engine 122 may identify the dependencies 114 of the virtualized application 112 and store the dependency data 126 identifying the dependencies 114 in the dependency analysis database 124. A user interface 130 might also be provided for viewing and editing the contents of the database 124. Additional details regarding various processes provided herein for identifying the dependencies 114 will be provided below with respect to FIGS. 2 and 3.

It should be appreciated that the embodiments described herein are merely for illustrative purposes and are not intended to limit the scope of the application to the embodiments described herein. Those skilled in the art should appreciate that the technologies described herein may be applied in conjunction with a variety of types of applications and that the embodiments disclosed herein are not limited to satisfying the dependencies of a virtualized application 112. It should also be understood that the concepts described herein may be applied to any type of application, including but not limited to virtualized and non-virtualized applications executing in virtualized and non-virtualized environments.

Figure 2:
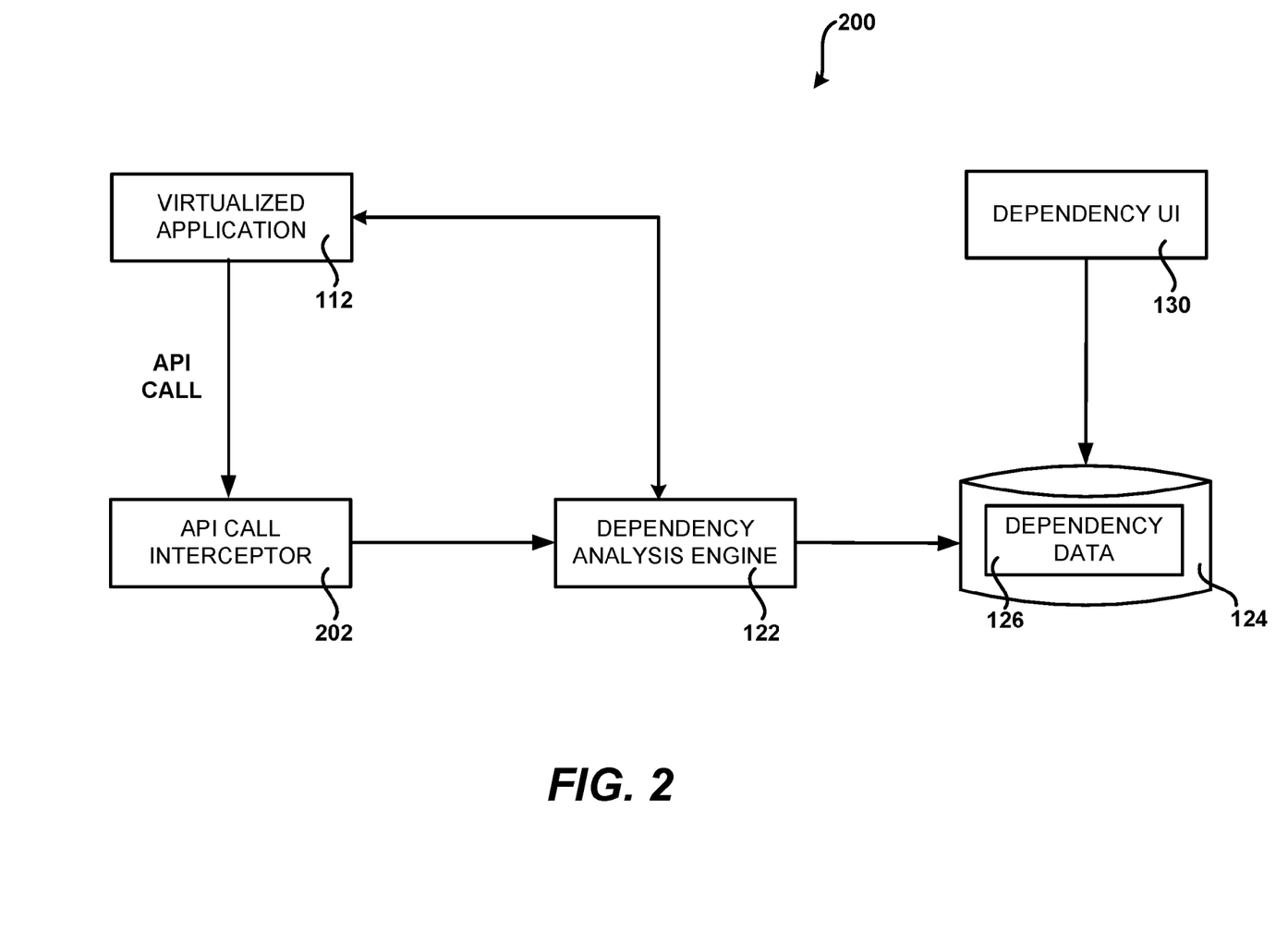
FIG. 2 is a schematic diagram showing one process for identifying the dependencies of a virtualized application, according to one embodiment presented herein.

FIG. 2 is a schematic diagram showing one process 200 for identifying the dependencies of the virtualized application 112 while the virtualized application 112 is executing in one environment, according to one embodiment presented herein. In particular, FIG. 2 illustrates aspects of a learning mode of operation utilized to identify the dependencies 114. In the learning mode of operation, an API call interceptor 202 intercepts API calls made by the application 112 for accessing resources. As will be discussed below, the API calls might be made during runtime of the application 112 or at the time the application 112 is installed.

When the virtualized application 112 is installed on a device, such as the client device 102, the installer for the application 112 might make changes to the device 102. For instance, various files pertaining to the virtualized application 112 may be stored or registry files may be created or modified. The dependency analysis engine 122 monitors the installation of the application 112 to detect any configuration changes made as a result of the installation of the virtualized application 112. The dependency analysis engine 122 might also compare the configuration of the computer on which it is executing prior to the virtualized application 112 being installed with the configuration after the virtualized application 112 is installed. The dependency analysis engine 122 may then utilize the detected changes to identify the dependencies 114. Dependency data 126 identifying the dependencies 114 is then stored in the dependency analysis database 124.

As a part of the learning mode of operation, the dependency analysis engine 122 may further monitor the virtualized application 112 during runtime. As the virtualized application 112 is executing, the virtualized application 112 may make API calls to access resources. The API call interceptor 202 hooks the API calls made by the virtualized application 112 and passes the calls to the dependency analysis engine 122, where they are inspected to gather information about additional dependencies 114 of the virtualized application 112. The API calls may include requests to access particular resources, such as files, databases, and the like. In addition, the API calls may include requests to access particular applications.

The dependency analysis engine 122 inspects the intercepted API calls to identify runtime dependencies 114 of the virtualized application 112. The dependency analysis engine 122 may store data identifying runtime dependencies 114 in the dependency analysis database 124. Additionally, data might be stored in the database 124 indicating whether the identified dependencies 114 are provided by an operating system 108. In alternate embodiments, data identifying runtime dependencies 114 may be streamed from the server 104 to the client device 102. In such embodiments, data identifying the dependencies may be packaged in an application package that may be configured to be streamed to the client device 102. As will be described in greater detail below, the data generated during the learning mode of operation is utilized at runtime of the application 112 to ensure that all of the dependencies 114 are available to the application 112. For instance, the dependency data 126 stored in the database 124 might be utilized to determine if the execution of an application is dependent upon any resources that are not provided by an operating system. If so, the resources might be made available to the application.

It should be appreciated that not all resources may be made available to the application. In such situations, the application may not be able to deploy on the device until the resources are made available and all of the dependencies of the application are properly satisfied. For example, a corporation may have documents that can only be accessed from within a corporate building. When a user outside the corporate building runs an application that interacts with those documents, the application virtualization client component 110 may prevent the application from accessing the documents. In this case, the dependency may be the presence of a corporate IP address indicating that the user is within the corporate building. If the user is not within the corporate building, the virtualized application 112 may not be deployed since the dependency corresponding to the presence of a corporate IP address is not satisfied.

Figure 3:
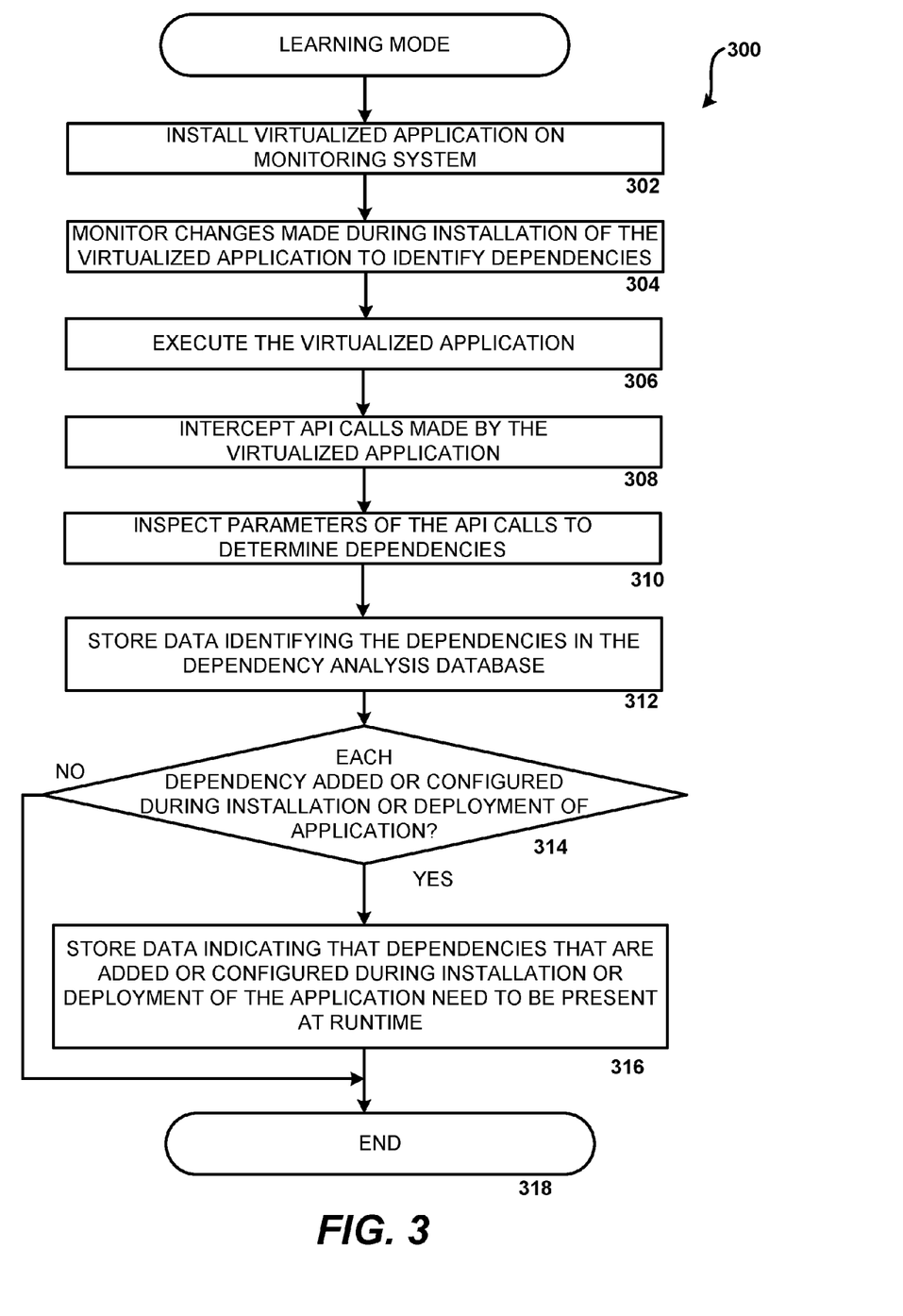
FIG. 3 is a flow diagram showing aspects of one illustrative process disclosed herein for identifying the dependencies of a virtualized application in a learning mode of operation, according to one embodiment presented herein.
Figure 4:
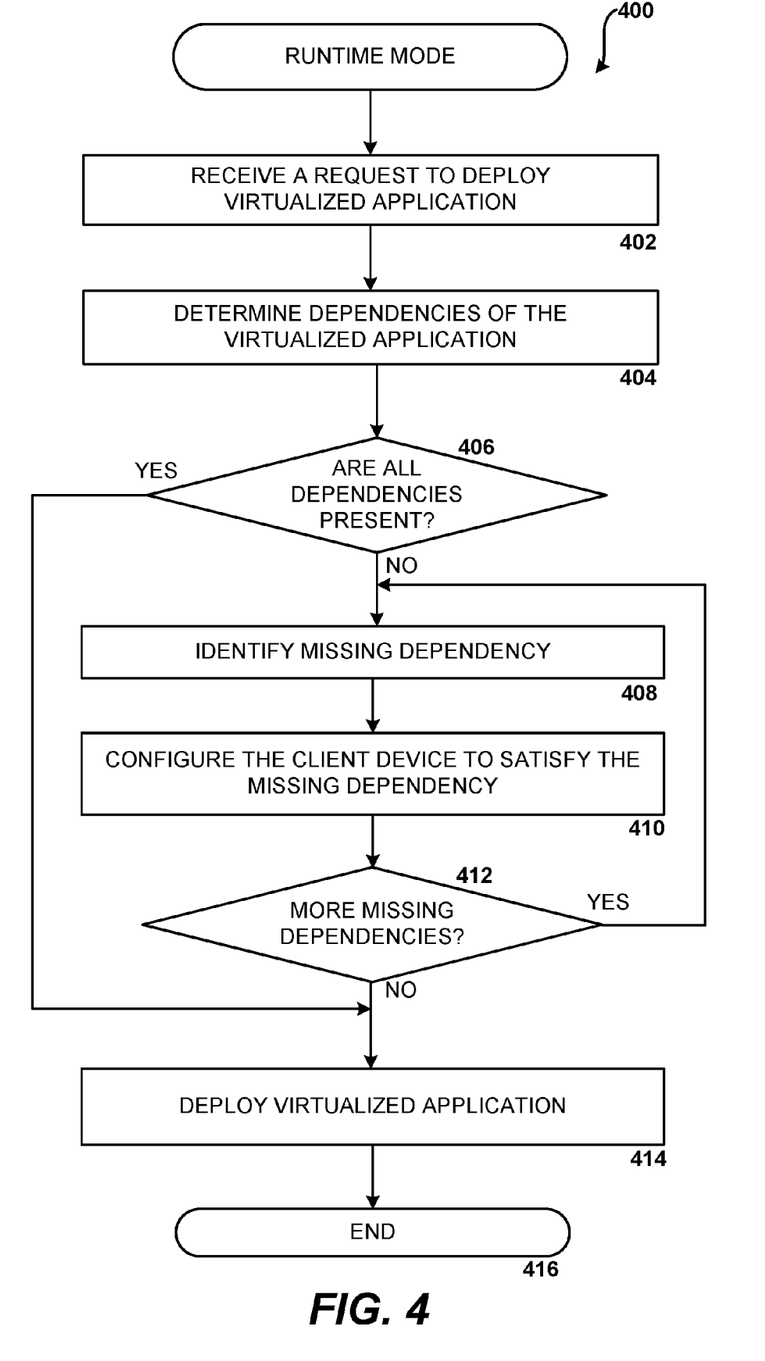
FIG. 4 is a flow diagram showing aspects of one illustrative process disclosed herein for satisfying the dependencies of a virtualized application, according to one embodiment presented herein.
Figure 6:
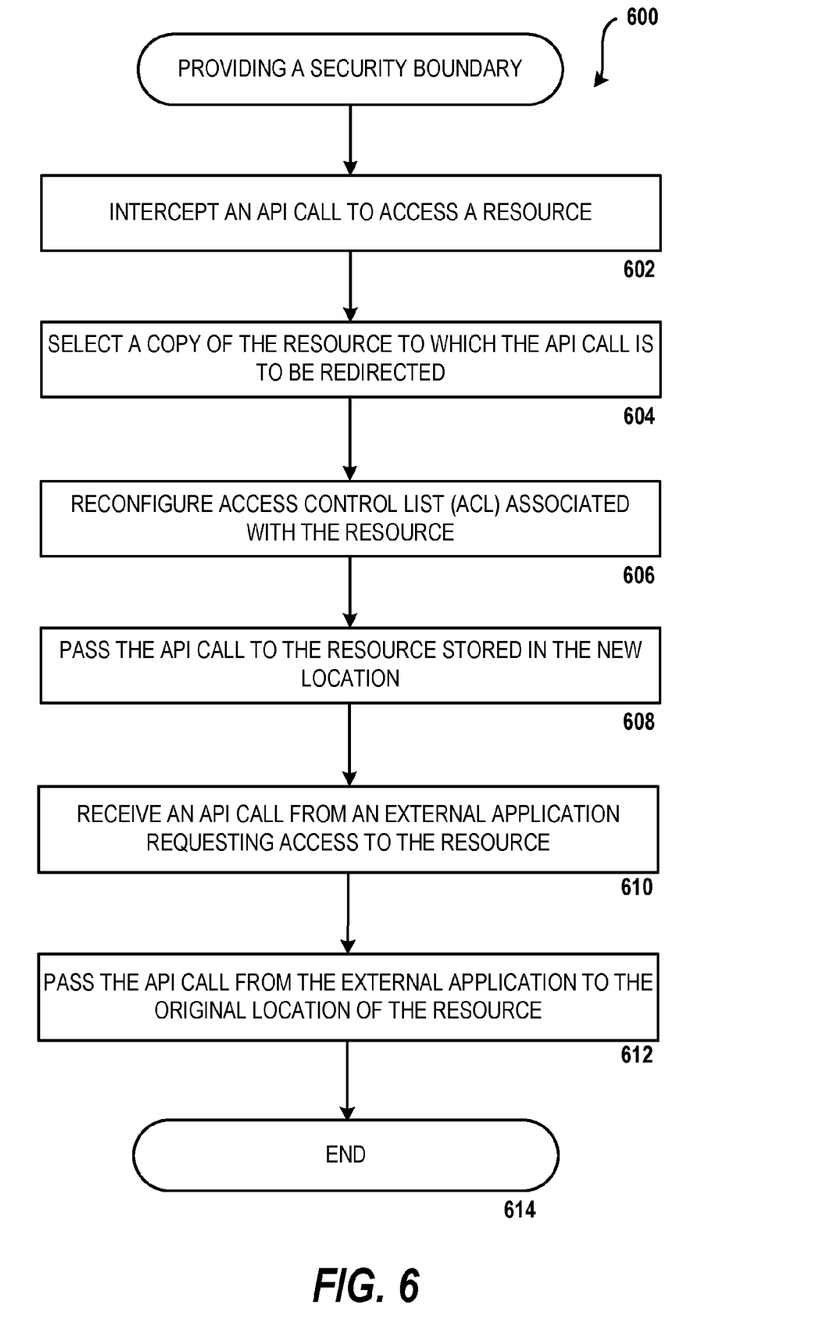
FIG. 6 is a flow diagram showing aspects of one illustrative process disclosed herein for providing a one-way security boundary to prevent external applications from interacting with resources, according to one embodiment presented herein.

FIG. 3 is a flow diagram showing aspects of one illustrative process disclosed herein for identifying the dependencies 114 of a virtualized application 112 in the learning mode discussed above. It should be appreciated that the logical operations described herein with respect to FIGS. 3, 4, and 6 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

FIG. 3 shows a routine 300 illustrating operations performed in the learning mode of operation shown in FIG. 2 and described above. The routine 300 begins at operation 302, where the virtualized application 112 is installed on a monitoring system, such as the server 104. The server 104 includes the dependency analysis engine 122 that provides the functionality described above for identifying the dependencies 114 of the virtualized application 112. The server 104 may also include all of the dependencies 114 requisite for the proper installation and execution of the virtualized application 112. In this manner, the virtualized application 112 may operate on the server 104 in a learning mode. It should be appreciated that another computer other than the server 104 might be utilized as the monitoring station for performing the learning process described herein.

According to one implementation, when the server 104 is operating in the learning mode, the dependency analysis engine 122 is configured to monitor changes made to the server 104 that identify the dependencies 114 of the virtualized application 112 and store the dependency data 126 identifying the dependencies 114 in the dependency analysis database 124. The dependencies 114 may include dependencies that are identified by analyzing the installation and configuration of the application 112 as well as dependencies identified by intercepting API calls made by the virtualized application 112 at runtime.

From operation 302, the routine 300 proceeds to operation 304, where the dependency analysis engine 122 monitors for changes made during the installation of the virtualized application 112. The dependency analysis engine 122 may monitor the changes by comparing the configuration settings of the system after the virtualized application 112 is installed to the configuration settings of the system prior to the installation of the virtualized application 112. Further, the dependency analysis engine 122 may monitor various resources of the system to identify the dependencies 114, such as changes made to a registry or the creation of additional files and folders related to the installation of the virtualized application 112.

From operation 304, the routine 300 proceeds to operation 306, where the virtualized application 112 is executed. During execution, the dependency analysis engine 122 continuously monitors the virtualized application 112 for API calls made by the virtualized application 112 to access resources as well as any configuration changes made as a result of the execution of the virtualized application 112.

From operation 306, the routine 300 proceeds to operation 308, where the API call interceptor 202 intercepts API calls made by the virtualized application 112. The API call interceptor 202 may then provide these API calls to the dependency analysis engine 122. From operation 308, the routine 300 proceeds to operation 310, where the dependency analysis engine 122 inspects the parameters of the intercepted API calls to identify the dependencies 114 of the virtualized application 112. As described above, the API calls may include requests to access a particular resource, such as a file, an application, or a hardware component, such as a speaker or a display. As such, the dependency analysis engine 122 is capable of determining the runtime dependencies of the virtualized application 112 by inspecting the format and content of the intercepted API calls.

From operation 310, the routine 300 proceeds to operation 312, where the dependency analysis engine 122 stores the dependency data 126 gathered during the installation and execution of the virtualized application 112 that identifies the dependencies 114 in the dependency analysis database 124. According to one implementation, the dependency analysis database 124 may be stored on the server 104 or any other location that is accessible by the client device 102 or the server 104 via the network 106.

From operation 312, the routine 300 proceeds to operation 314, where a determination is made as to whether each of the dependencies 114 of the virtualized application 112 is added or configured during the installation or deployment of the virtualized application 112. This may be accomplished, for instance, by examining an operating system provided registry. Alternately, this is accomplished by examining a mapping table that maps API calls to dependencies. The mapping table may include information indicating whether each dependency is provided by an operating system.

From operation 314, the routine 300 proceeds to operation 316 if the dependency is added or configured during the installation or deployment of the application. At operation 316, data is stored in the dependency analysis database 124 indicating that the dependencies 114 that are added or configured during the installation or deployment of the virtualized application 112 will need to be present at the client device 102 at runtime to successfully deploy the virtualized application 112 at the client device 102. If, at operation 314, it is determined that the dependencies 114 are not added or configured during the installation or deployment of the virtualized application 112, the routine 300 proceeds to operation 318, where the routine 300 ends. Similarly, from operation 316, the routine 300 also proceeds to operation 318, where the routine 300 ends.

Once the dependencies 114 of the virtualized application 112 have been identified and the dependency data 126 identifying the dependencies 114 is stored in the dependency analysis database 124, the virtualized application 112 may be deployed at the client device 102. However, prior to deploying the virtualized application 112 at the client device 102, the dependencies 114 required for deploying the virtualized application 112 may need to be accessible by the client device 102. In one implementation, the dependency data 126 identifying the dependencies 114 is stored on the client device 102 and utilized by the application virtualization client component 110 to ensure that the dependencies 114 of the virtualized application 112 are present at runtime of the deployment of the virtualized application 112 on the client device 102. Additional details regarding this process are provided below with respect to FIG. 4.

FIG. 4 is a flow diagram showing aspects of one illustrative process disclosed herein for satisfying the dependencies of the virtualized application 112 on the client device 102, according to one embodiment presented herein. In particular, FIG. 4 shows a routine 400 illustrating operations performed at runtime of the application 112. In particular, the routine 400 begins at operation 402, where the application virtualization client component 110 receives a request to deploy the virtualized application 112 on the client device 102. According to one implementation, a user of the client device 102 may submit the request to deploy the virtualized application 112 on the client device 102.

From operation 402, the routine 400 proceeds to operation 404, where the application virtualization client component 110 determines the dependencies 114 of the virtualized application 112 by querying the dependency analysis database 124. The application virtualization client component 110 might also query the dependency analysis database 124 to determine whether the identified dependencies are provided by an operation system 108. If so, the dependencies do not need to be restored at runtime by the application virtualization client component 110.

From operation 404, the routine 400 proceeds to operation 406, where the application virtualization client component 110 determines if all of the dependencies 114 are present. According to some implementations, the application virtualization client component 110 may do so by comparing the dependencies 114 determined by the dependency analysis engine 122 during the learning mode to the dependencies present at the client device 102. If the application virtualization client component 110 determines that all of the dependencies 114 are present, the routine 400 proceeds to operation 414, where the application virtualization client component 110 deploys the virtualized application 112 on the client device 102.

However, if at operation 406, the application virtualization client component 110 determines that all of the dependencies 114 are not present at the client device 102, the routine 400 proceeds from operation 406 to operation 408, where the application virtualization client component 110 identifies a missing dependency. A missing dependency may be a resource that is not present or not properly configured. For instance, if one of the dependencies 114 includes turning on a firewall at the client device 102, the application virtualization client component 110 may check the client device 102 to see if the firewall is turned on. If the firewall is not turned on, then the application virtualization client component 110 identifies the firewall as being a missing dependency.

From operation 408, the routine 400 proceeds to operation 410, where the application virtualization client component 110 configures the client device 102 such that the missing dependency is satisfied. The application virtualization client component 110 may do so by configuring the client device 102 in such a way that the configuration settings of the client device 102 match the configuration settings of the server 104 when the virtualized application 112 was installed and executing on the server 104. Using the example described above, the application virtualization client component 110 may automatically turn on the firewall by changing the firewall settings of the client device 102. In some embodiments, the application virtualization client component 110 might also make a resource available. In this way, the application virtualization client component 110 may configure the client device 102 such that the dependencies 114 requisite for deploying and/or executing the application are satisfied.

From operation 410, the routine 400 proceeds to operation 412, where the application virtualization client component 110 determines if there are any more missing dependencies 114. If the application virtualization client component 110 determines that there are more missing dependencies 114, the routine 400 proceeds back to operation 406, where the routine 400 identifies another missing dependency. If, however, the application virtualization client component 110 determines that there are no more missing dependencies 114, the routine 400 proceeds to operation 414, where the application virtualization client component 110 deploys the virtualized application 112. From operation 414, the routine 400 proceeds to operation 416, where the routine 400 ends. It should be appreciated that the application virtualization client component 110 may not be able to satisfy every dependency required for deploying the virtualized application 112. For instance, in the example described above, the application virtualization client component 110 may be unable to satisfy a dependency, such as the presence of a corporate IP address, which is provided only to devices operating within the corporate building.

Figure 5:
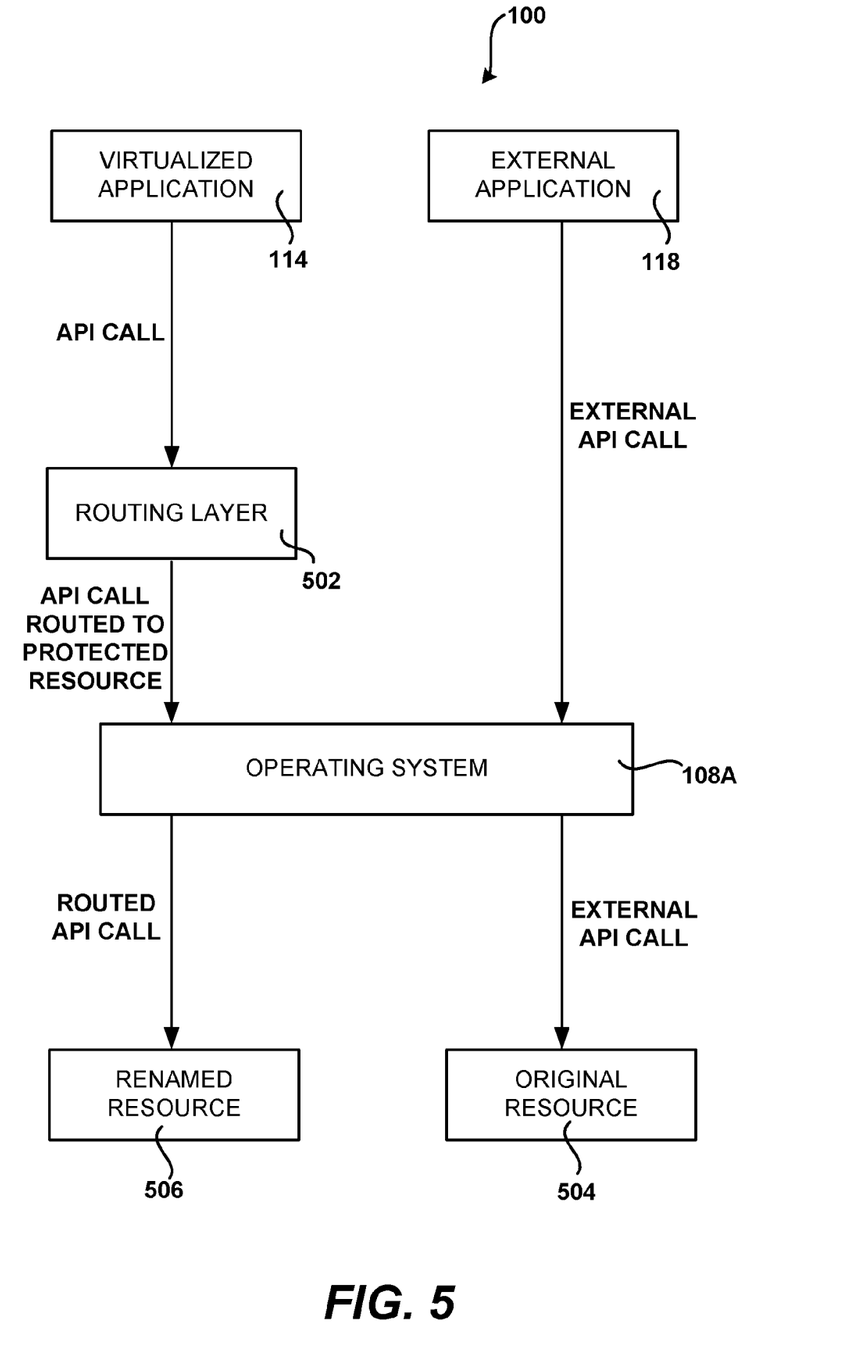
FIG. 5 is a schematic diagram showing one process for providing a security boundary to prevent external non-virtualized applications from accessing resources, according to one embodiment presented herein.

FIG. 5 is a schematic diagram showing a process for providing a security boundary to prevent external applications from accessing resources available to the application 112. According to some implementations, non-enterprise applications installed on the client device 102, such as the external application 118 may attempt to gain access to the resources utilized by the virtualized application 112. This may pose a security threat and therefore, efforts may be made to prevent the external application 118 from interacting with the resources. In one implementation, the client device 102 provides functionality for redirecting API calls made by external applications to prevent the external application 118 from accessing the resources. In some implementations, this redirection may occur by modifying the names of the resources (which may be referred to herein as "namespace mangling"). FIG. 5 illustrates one process provided herein for performing this functionality.

When a virtualized application 112 makes an API call to access or modify an external resource, a routing layer 502 intercepts the API call and performs two functions. First, the routing layer 502 causes the name of the original resource 504 to be modified thereby creating a renamed resource 506. As a result, the external application 118 executing outside of the application virtualization client component 110 cannot look in the expected place for the resource. In this way, curious applications are deterred from trying to gain access to the resource. However, a determined external application 118 may still open and access the original resource 504. To prevent any determined external application from accessing the resource, the application virtualization client component 110 might also modify an access control list (ACL) of the original resource 504 to a customized ACL such that the external application 118 cannot open or access the resource 504. FIG. 6 illustrates additional aspects of this process.

It should be appreciated that the application virtualization client component 110 can have multiple copies of a resource and can redirect different processes to see different versions of the resource. For instance, the client device 102 might have two copies of a registry value named 'foo', where one copy is set to 0 and the other to 1. When one process accesses the registry value, the client device 102 transparently redirects the process to the copy of the resource that is set to 0. When the other process accesses what it thinks is the same registry value, the client device 102 transparently redirects this process to the copy of the resource that is set to 1. Both processes are attempting to access the same resource but the client device 102 is redirecting them to differently-named instances of that resource without them being aware of it. In this way, the two processes may perform two separate operations since the two processes are receiving different input values. As a result, the client device 102 is capable of providing authorized applications the correct input values, while providing unauthorized applications, incorrect input values that may provide security to the client device 102.

In another example, when two processes attempt to access the same file, the client device 102 could redirect one of them to a valid copy of the file, and could inform the other one that the file did not exist, or alternately, redirect it to a location where no file existed and allow the operating system to respond. As a result, the unauthorized process may not be provided access to the file.

FIG. 6 is a flow diagram showing aspects of one illustrative process disclosed herein for providing a security boundary. In particular, FIG. 6 shows a routine 600 illustrating operations performed in one embodiment for providing a security boundary in the manner described above with reference to FIG. 5.

The routine 600 begins at operation 602, where the routing layer 502 intercepts an API call made by the virtualized application 112 to access a resource. As described above, the routing layer 502 may only intercept API calls made by the virtualized application 112. From operation 602, the routine 600 proceeds to operation 604, where the routing layer 502 selects a copy of the resource to which the API call made by the virtualized application 112 is to be redirected. The copy of the resource may previously have been saved by the operating system. From operation 604, the routine 600 proceeds to operation 606, where the operating system 108A further reconfigures an ACL associated with the resource so that the resource is not accessible to external applications operating outside of the application virtualization client component 110. From operation 606, the routine 600 proceeds to operation 608, where the intercepted API call is routed to the renamed resource 506.

From operation 608, the routine 600 proceeds to operation 610, where the operating system 108A receives an API call requesting access to the resource from the external application 118. According to embodiments, since the external application 118 communicates directly with the operating system 108A without going through the application virtualization client component 110, the operating system 108A receives the API call from the external application 118. It should be appreciated however, that the external application may send API calls through the application virtualization client component 110. In such embodiments, the application virtualization client component 110 does not do any of the redirection, but instead passes the original API call to the operating system 108A for the operating system 108A to handle.

From operation 610, the routine 600 proceeds to operation 612, where the operating system 108A routes the API call from the external application 118 to the original resource 504. In this way, API calls made from non-enterprise applications, such as the external application 118 may not access the resource 506. From operation 612, the routine 600 proceeds to operation 614, where the routine 600 ends.

Figure 7:
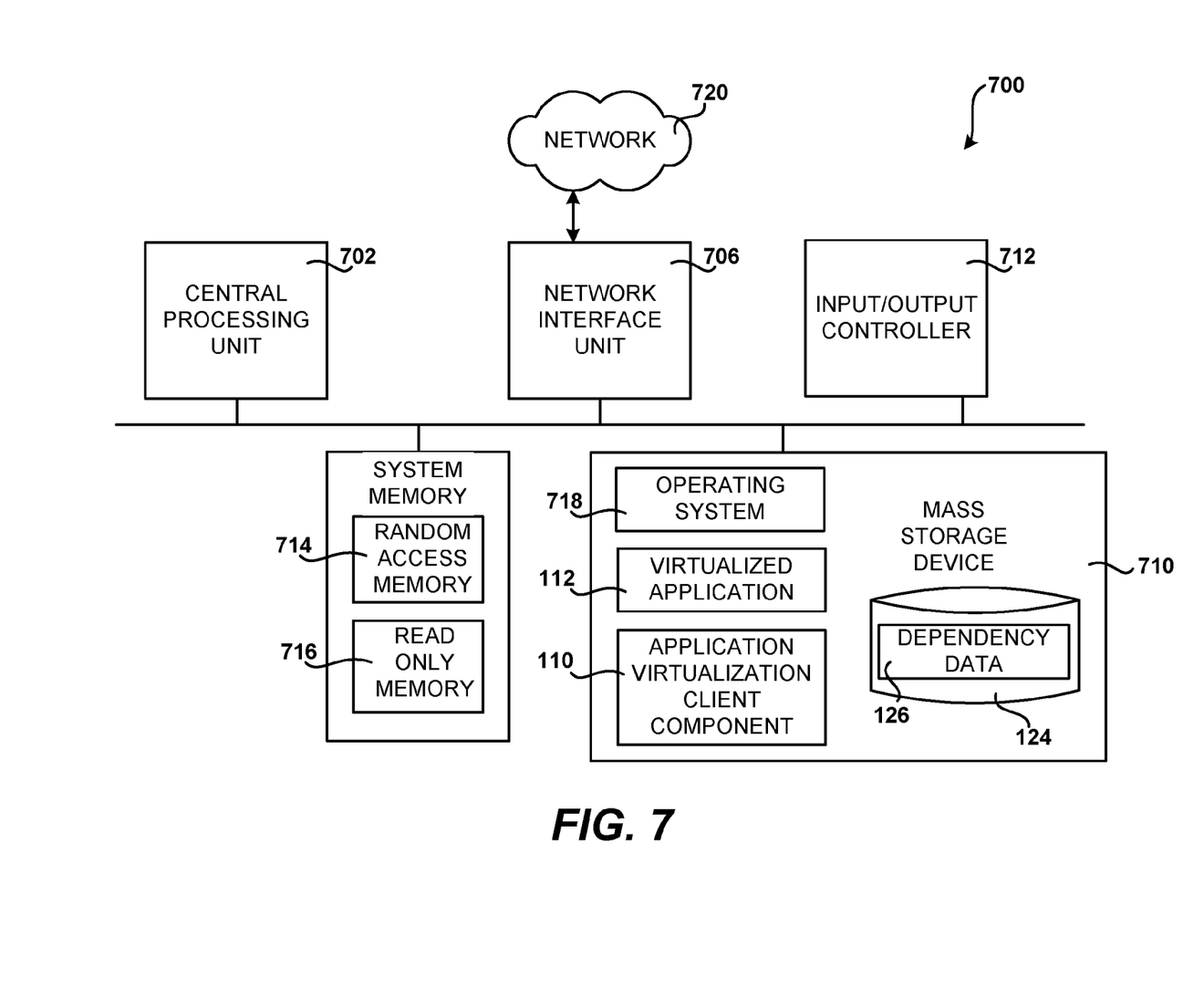
FIG. 7 is a computer architecture diagram showing an illustrative computer hardware and software architecture for a computing system capable of implementing the various embodiments presented herein.

FIG. 7 is a computer architecture diagram showing an illustrative computer hardware and software architecture for a computing system capable of implementing the various embodiments presented herein. The computer architecture shown in FIG. 7 illustrates a conventional desktop, laptop computer, or server computer and may be utilized to execute the various software components described herein.

The computer architecture shown in FIG. 7 includes a central processing unit 702 ("CPU"), a system memory 708, including a random access memory 714 ("RAM") and a read-only memory ("ROM") 716, and a system bus 704 that couples the memory to the CPU 702. A basic input/output system ("BIOS") containing the basic routines that help to transfer information between elements within the computer 700, such as during startup, is stored in the ROM 716. The computer 700 further includes a mass storage device 710 for storing an operating system 718, application programs, and other program modules, which will be described in greater detail below.

The mass storage device 710 is connected to the CPU 702 through a mass storage controller (not shown) connected to the bus 704. The mass storage device 710 and its associated computer-readable storage media provide non-volatile storage for the computer 700. Although the description of computer-readable media contained herein refers to a mass storage device, such as a hard disk or CD-ROM drive, it should be appreciated by those skilled in the art that computer-readable storage media can be any available computer storage media that can be accessed by the computer 700.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 700.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer-readable storage media does not encompass communication media.

According to various embodiments, the computer 700 may operate in a networked environment using logical connections to remote computers through a network such as the network 720. The computer 700 may connect to the network 720 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer 700, including an operating system 718 suitable for controlling the operation of a networked desktop, laptop, or server computer. The mass storage device 710 and RAM 714 may also store one or more program modules. In particular, the mass storage device 710 and the RAM 714 may store the virtualized application 112, the application virtualization client component 110, and/or the other software components described above. The mass storage device 710 and RAM 714 may also store other program modules and data, such as the dependencies 114.

In general, software applications or modules may, when loaded into the CPU 702 and executed, transform the CPU 702 and the overall computer 700 from a general-purpose computing system into a special-purpose computing system customized to perform the functionality presented herein. The CPU 702 may be constructed from any number of transistors or other discrete circuit elements, which may individually or collectively assume any number of states. More specifically, the CPU 702 may operate as one or more finite-state machines, in response to executable instructions contained within the software or modules. These computer-executable instructions may transform the CPU 702 by specifying how the CPU 702 transitions between states, thereby physically transforming the transistors or other discrete hardware elements constituting the CPU 702.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for ensuring that application dependencies are satisfied at runtime have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method, comprising:
   receiving a request to deploy or execute an application at a client device;
   determining whether each of one or more dependencies requisite for deploying or executing the application is present at the client device;
   upon determining that each of the one or more dependencies requisite for deploying or executing the application is not present, configuring the client device such that the dependencies are present and deploying or executing the application at the client device;
   based on deploying or executing the application at the client device, intercepting an application programming interface (API) call from the application, the API call requesting access to a resource;
   selecting a copy of the resource associated with the API call;
   protecting a new location with an access control list (ACL) associated with the resource; and
   redirecting the API call to the resource stored at the new location.

2. The computer-implemented method of claim 1, further comprising prior to deploying or executing the application:
   installing the application on a monitoring station;
   monitoring changes made to the monitoring station during the installation of the application to identify the dependencies; and
   storing data identifying the dependencies in a dependency analysis database.

3. The computer-implemented method of claim 2, further comprising prior to deploying or executing the virtualized application:

executing the virtualized application on the monitoring station;

monitoring changes made to the monitoring station during the execution of the virtualized application to identify the dependencies; and storing data identifying the dependencies in the dependency analysis database.

4. The computer-implemented method of claim 3, wherein monitoring changes made to the monitoring station during the execution of the application comprises:

intercepting API calls made by the application during execution; and inspecting parameters contained in the API calls to identify the dependencies.

5. The computer-implemented method of claim 4, further comprising:

determining whether each of the one or more dependencies is added or configured during the installation, execution, or deployment of the application;

upon determining that each of the one or more dependencies is added or configured during the installation, execution, or deployment of the application, storing data indicating that the one or more dependencies that is added or configured during the installation, execution, or deployment of the application will need to be present at a runtime of the application.

6. The computer-implemented method of claim 5, wherein determining whether each of the one or more dependencies is added or configured during the installation, execution, or deployment of the application comprises querying a registry provided by the operating system.

7. The computer-implemented method of claim 5, wherein determining whether each of the one or more dependencies is added or configured during the installation, execution, or deployment of the application comprises querying an internal mapping table that matches API calls to dependencies.

8. A computer-readable hardware storage device having computer executable instructions stored thereupon which, when executed by a computer, cause the computer to:

receive a request to deploy or execute a virtualized application at a client device;

based on a determination that each of one or more dependencies required to deploy or execute the virtualized application is not present, configure the client device such that the dependencies are present and, in response to configuring the client device, deploy or execute the virtualized application at the client device;

upon deploying or executing the virtualized application at the client device, protecting a new location with an access control list (ACL) associated with a resource intercept intercepted from an application programming interface (API) call from the virtualized application.

9. The computer-readable hardware storage device of claim 8, having further computer-executable instructions stored thereon which, when executed by the computer, cause the computer to:

redirecting the API call to the resource stored at the new location.

10. The computer-readable hardware storage device of claim 8, having further computer-executable instructions stored thereon which, when executed by the computer, cause the computer to:

install the virtualized application on a monitoring station;

monitor changes made to the monitoring station during the installation of the virtualized application to identify the dependencies; and package data identifying the dependencies in an application package configured to be streamed to the client device.

11. The computer-readable hardware storage device of claim 10, having further computer-executable instructions stored thereon which, when executed by the computer, cause the computer to:

execute the virtualized application installed on the monitoring station;

monitor changes made to the monitoring station during the execution of the virtualized application to identify the dependencies; and package data identifying the dependencies in the application package configured to be streamed to the client device.

12. The computer-readable hardware storage device of claim 11, wherein monitoring changes made to the monitoring station during the execution of the virtualized application to identify the dependencies comprises:

intercepting API calls made by the virtualized application during execution; and inspecting parameters contained in the API calls to identify the dependencies.

13. The computer-readable hardware storage device of claim 12, having further computer-executable instructions stored thereon which, when executed by the computer, cause the computer to:

determine whether each of the one or more dependencies is added or configured during the installation, execution, or deployment of the application;

upon determining that each of the one or more dependencies is added or configured during the installation, execution, or deployment of the application, store data indicating that the one or more dependencies that are added or configured during the installation, execution, or deployment of the application will need to be present at a runtime of the virtualized application.

14. The computer-readable hardware storage device of claim 13, wherein determining whether each of the one or more dependencies is added or configured during the installation, execution, or deployment of the application comprises querying a registry provided by the operating system.

15. The computer-readable hardware storage device of claim 13, wherein determining whether each of the one or more dependencies is added or configured during the installation, execution, or deployment of the application comprises querying a table that maps API calls to dependencies.

16. A system comprising:

a processor; and a computer-readable hardware storage medium in communication with the processor, the computer-readable storage medium having computer-executable instructions stored thereupon which, when executed by the processor, cause the processor to:

install and execute a virtualized application on a monitoring station;

monitor changes made to the monitoring station during the installation and execution of the virtualized application, including intercepting application programming interface (API) calls, to identify from the intercepted API calls one or more dependencies of the virtualized application that are requisite for deploying or executing the virtualized application;

store data identifying the dependencies in a dependency analysis database;

receive a request to deploy or execute a virtualized application at a client device;

in response to the request, determine whether each of the one or more dependencies is present at the client device including querying the data within the dependency analysis database to determine the one or more dependencies that need to be present at a runtime of the application;

upon determining that each of the one or more dependencies are not present at the client device, configure the client device such that each of the one or more dependencies is present; and upon determining that each of the one or more dependencies requisite for deploying or executing the virtualized application is present, deploy or execute the virtualized application at the client device.

17. The system of claim 16, having further computer-executable instructions stored thereon which, when executed by the computer, cause the computer to:

upon deploying or executing the virtualized application at the client device, intercept an application programming interface (API) call from the virtualized application, the API call requesting access to a resource on the client device;

selecting a copy of the resource to which the API call is to be redirected;

protecting a new location with an access control list (ACL) associated with the resource; and redirecting the API call to the resource stored at the new location.

18. A computer-readable hardware storage device having computer-executable instructions stored thereupon which, when executed by a computer, cause the computer to:

install and execute a virtualized application on a monitoring station at a client device;

monitor changes made to the monitoring station during the installation and execution of the virtualized application to identify one or more dependencies of the virtualized application that are requisite for deploying or executing the virtualized application, wherein monitoring of the changes includes intercepting and inspected application programming interface (API) calls made by the application during execution;

store data identifying the dependencies in a dependency analysis database;

determine whether each of the one or more dependencies is added or configured during the installation and execution of the application including performing either or both of (i) querying a registry provided by an operating system or (ii) querying an internal mapping table that matches API calls to dependencies;

receive a request to deploy or execute a virtualized application at the client device;

in response to the request, determine whether each of the one or more dependencies is present at the client device using the data;

upon determining that each of the one or more dependencies are not present at the client device, configure the client device such that each of the one or more dependencies is present.

19. The computer-readable hardware storage device of claim 18, having further computer-executable instructions stored thereon which, when executed by the computer, cause the computer to:

upon deploying or executing the virtualized application at the client device, intercept an application programming interface (API) call from the virtualized application, the API call requesting access to a resource on the client device;

selecting a copy of the resource to which the API call is to be redirected;

protecting a new location with an access control list (ACL) associated with the resource; and redirecting the API call to the resource at the new location.

20. The computer-readable hardware storage device of claim 18, wherein the one or more dependencies comprise configuration settings, hardware components, network connections, access privileges, a presence of a specific file in a specific location, and application resources.

21. The computer-readable hardware storage device of claim 18, wherein the one or more dependencies comprise a location of a user in relation to a predetermined location.

* * * * *